US009556408B2

(12) United States Patent
Grose et al.

(10) Patent No.: US 9,556,408 B2
(45) Date of Patent: Jan. 31, 2017

(54) PEDAL-POWERED BREWING SYSTEM (71) Applicant: Windmill Pointe Brewing Company L.L.C., Redford, MI (US)

(72) Inventors: Shawn M. Grose, Redford, MI (US); Aaron Grose, Grosse Pointe, MI (US)

(73) Assignee: Windmill Pointe Brewing Company L.L.C., Redford, MI (US)

( * ) Notice: Subject to any disclaimer, the term of this patent is extended or adjusted under 35 U.S.C. 154(b) by 306 days.

(21) Appl. No.: 14/486,163

(22) Filed: Sep. 15, 2014

(65) Prior Publication Data

US 2015/0075386 A1 Mar. 19, 2015

Related U.S. Application Data (60) Provisional application No. 61/877,638, filed on Sep. 13, 2013.

(51) Int. Cl.
| | |
|---|---|
| *C12C 11/00* | (2006.01) |
| *C12C 7/06* | (2006.01) |
| *C12C 13/00* | (2006.01) |
| *C12C 13/02* | (2006.01) |
| *H02J 7/32* | (2006.01) |
| *H02K 7/18* | (2006.01) |

(52) U.S. Cl.
CPC ............... *C12C 13/00* (2013.01); *C12C 13/02* (2013.01); *H02J 7/32* (2013.01); *H02K 7/1861* (2013.01)

(58) Field of Classification Search
CPC .......... C12C 13/00; C12C 13/02; C12C 13/08; C12C 13/10; H02K 7/1846; H02K 7/1861
USPC ................ 99/276, 278; 426/11, 16
See application file for complete search history.

(56) References Cited

U.S. PATENT DOCUMENTS

| | | | |
|---|---|---|---|
| 3,377,505 | A | 4/1968 | Engle |
| 5,252,859 | A | 10/1993 | Tagney |
| 5,616,104 | A | 4/1997 | Mulenburg et al. |
| 6,987,327 | B1 | 1/2006 | Lucatero |

(Continued)

FOREIGN PATENT DOCUMENTS

| | | |
|---|---|---|
| DE | 10331115 A1 | 3/2005 |
| DE | 202008004354 U1 | 7/2008 |

(Continued)

OTHER PUBLICATIONS

Colby, Chris, "ABCs of Recirculated Brewing Systems"; article dated Nov. 2006; located online at https://byo.com/equipment/item/84-abcs-of-recirculated-brewing-systems on Sep. 11, 2014.

(Continued)

*Primary Examiner* — Dana Ross
*Assistant Examiner* — Lindsey C Staubach
(74) *Attorney, Agent, or Firm* — Oppenhuizen Law PLC (57) ABSTRACT A brewing system that includes bicycle-driven generators to offset, or supply, the electricity used in the brewing process. The brewing system includes at least one bicycle, a bicycle generator associated with each bicycle, and electrical components to store the electricity generators and/or feed the electricity back into a power grid. The electricity is then drawn on during the brewing process. There is also provided a data collector for receiving the electricity generated by each bicycle, a computer for monitoring and recording the electricity generated by each bicycle, and a video monitor that displays real-time statistics of the electricity produced by each bicycle.

14 Claims, 5 Drawing Sheets

(56) References Cited

U.S. PATENT DOCUMENTS

| | | |
|---|---|---|
| 7,205,732 B1 | 4/2007 | Gold |
| 7,253,534 B2 | 8/2007 | Vasilovich et al. |
| 7,560,822 B1 | 7/2009 | Hoffmann |
| 2009/0054207 A1 | 2/2009 | Lin et al. |
| 2009/0148556 A1 | 6/2009 | Stippler et al. |
| 2012/0208675 A1 | 8/2012 | Hu et al. |

FOREIGN PATENT DOCUMENTS

| | | |
|---|---|---|
| EP | 2495868 A1 | 9/2012 |
| ES | 2148100 | 11/1998 |
| WO | 2010086814 A1 | 8/2010 |

OTHER PUBLICATIONS

Smith, Brad, "RIMS and HERMS—Recirculating Infusion Mash Systems for Beer"; article dated Aug. 11, 2011; located online at http://beersmith.com/blog/2011/08/11/rims-and-herms-recirculating-infusion-mash-systems-for-beer/#comments on Sep. 11, 2014.

Webpage for ASE bicycle generator, obtained online on Sep. 10, 2013.

Webpage for Combiner box for use with bicycle generator, obtained online on Sep. 10, 2013.

Webpage from Uinta Brewing Company website, available at http://www.uintabrewing.com/ourstory.php, webpage content downloaded on Sep. 9, 2013.

PEDAL-POWERED BREWING SYSTEM

CROSS REFERENCE TO RELATED APPLICATION

This application claims the benefit of U.S. Provisional Application 61/877,638, which was filed on Sep. 13, 2013, the disclosure of which is hereby incorporated by reference.

BACKGROUND OF THE INVENTION

1. Field of the Invention

The present invention pertains to an electric brewing system. More particularly, the present invention pertains to an electric brewing system powered by human-generated electricity. Even more particularly, the present invention pertains to an electric brewing system powered by electricity created by bicycle-powered generators.

2. Description of the Prior Art

Brewing beer is a process which requires a great deal of energy. Energy is required to (1) heat water for the mash tun, (2) boil the wort in the kettle, (3) cool the wort to a temperature that is suitable for pitching the yeast, and then (4) controlling the temperature of the beer as it ferments. These energy costs represent a considerable share of the total production costs of beer. It is assumed that the share of the energy costs will continue to trend upward due to the shortage of fossil fuels and the associated higher energy costs.

Furthermore, there is a growing movement toward using renewable and green energy sources to reduce the impact on the environment. For example, Uinta Brewing Company, located in Salt Lake City, Utah, adopted this strategy in its brewing process when it became 100% powered by wind turbines in 2001. It has since added solar panels to supplement its growing energy demands.

In addition, U.S. Patent Application Publication No. 2009/0148556 to Stippler et al. discloses a brewery in which the brewing water is at least partially heated using solar collectors which convert solar radiation from the sun into thermal energy.

The present invention, as detailed hereinbelow, seeks to further improve upon these green energy sources for brewing by providing a cooperative system of powering the brewery that is interactive with its patrons by using electricity actually generated by the patrons, and which also displays the production of green energy in a manner that encourages further participation and production.

SUMMARY OF THE INVENTION

The present invention provides a brewing system which generally comprises:

(a) at least one bicycle;
(b) a bicycle generator associated with each bicycle, the bicycle generator being powered by the bicycle, and the bicycle generator producing DC power;
(c) a data collector that is electrically connected with each bicycle generator, the data collector having at least one electrical input, the electrical input being connected to a respective bicycle generator and receiving electricity therefrom, the data collector also having an electrical power output associated with each electrical input, and a data output;
(d) a computer that is connected to, and receives data from, the data output, the computer having software that is configured to monitor and record the amount of electricity generated by each bicycle generator;
(e) a video monitor that is connected to, and receives a video signal from, the computer, the video monitor configured to display real-time statistics of the electricity produced by each bicycle;
(f) a power inverter connected to each electrical power output, the power inverter being configured to convert the DC power into AC power;
(g) a breaker box connected to the power inverter, the breaker box receiving the AC power from the power inverter;
(h) a power grid connected to the breaker box, the power grid receiving the AC power from the breaker box; and
(i) a brewery including a hot liquor tank for heating water used in brewing beer, the hot liquor tank having at least one electric heating element that is electrically connected to the breaker box and powered by electricity drawn from the power grid, and the brewery further having a mash tun in fluid communication with the hot liquor tank, whereby water is heated in the hot liquor tank by the electric heating element and then transferred to the mash tun.

The present invention provides a second embodiment for a brewing system which generally comprises:

(a) at least one bicycle;
(b) a bicycle generator associated with each bicycle, the bicycle generator being powered by the bicycle, and the bicycle generator producing DC power;
(c) a data collector that is electrically connected with each bicycle generator, the data collector having at least one electrical input, the electrical input being connected to a respective bicycle generator and receiving electricity therefrom, the data collector also having an electrical power output associated with each electrical input, and a data output;
(d) a computer that is connected to, and receives data from, the data output, the computer having software that is configured to monitor and record the amount of electricity generated by each bicycle generator;
(e) a video monitor that is connected to, and receives a video signal from, the computer, the video monitor configured to display real-time statistics of the electricity produced by each bicycle;
(f) at least one battery connected to each electrical power output for storing the DC power;
(g) a power inverter connected to the battery, the power inverter being configured to convert the DC power into AC power; and
(h) a brewery including a hot liquor tank for heating water used in brewing beer, the hot liquor tank having at least one electric heating element that is connected to the power inverter and powered by electricity drawn from the battery, and the brewery also having a mash tun in fluid communication with the hot liquor tank, whereby water is heated in the hot liquor tank by the electric heating element and then transferred to the mash tun.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

Figure 1:
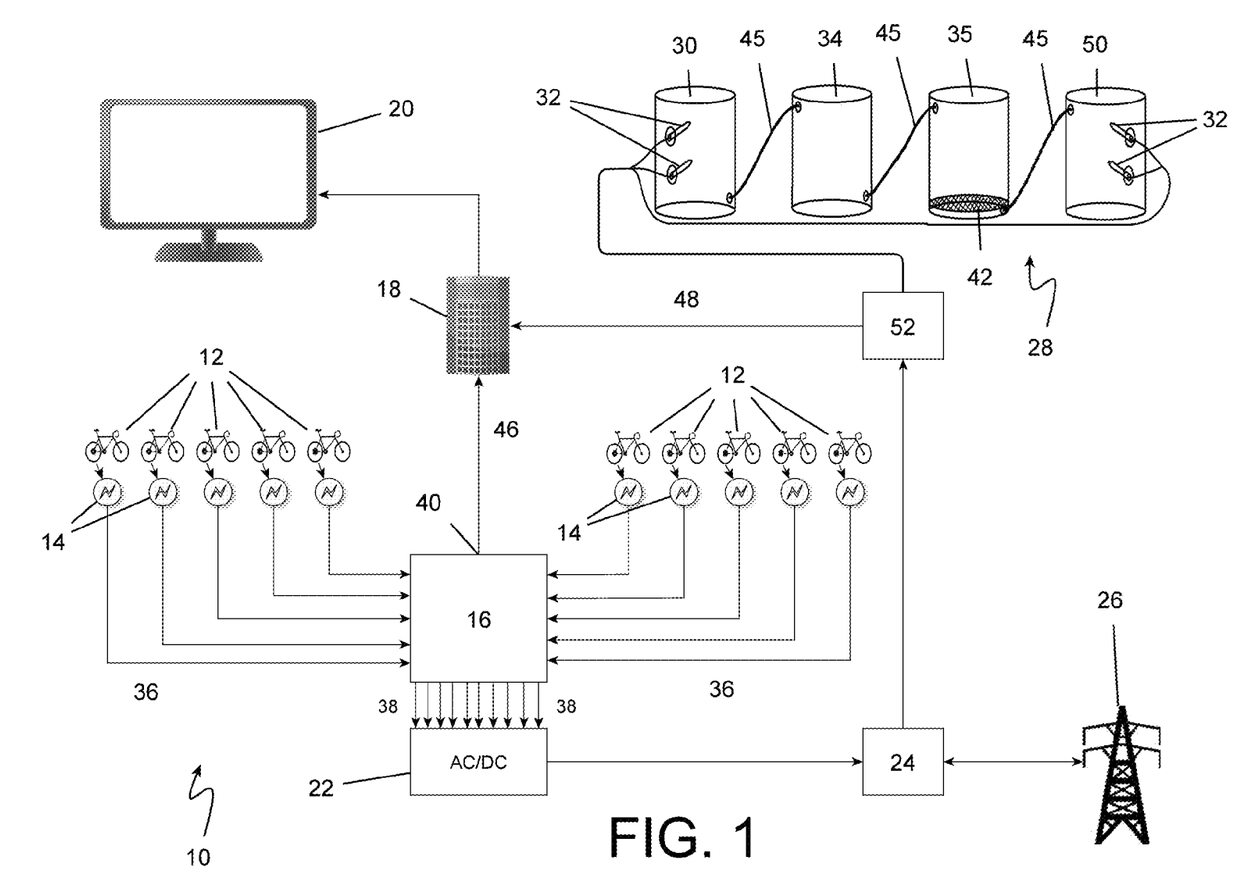
FIG. 1 is a schematic view showing a first embodiment of the present invention hereof.

In accordance with the present invention, and as shown generally in FIG. 1, there is provided a brewing system 10 which generally comprises: (a) at least one bicycle 12; (b) a bicycle generator 14 associated with each provided bicycle 12; (c) a data collector 16 electrically connected with the bicycle generator(s) 14; (d) a computer 18 that is connected to and receives data from the data collector 16; (e) a video monitor 20 that is connected to and receives a video signal from the computer 18; (f) a power inverter 22 connected to and receiving electrical power output 38 from the data collector 16; (g) a breaker box 24 connected to the power inverter 22; (h) a power grid 26 connected to the breaker box 24; and (i) a brewery 28 including a hot liquor tank 30 for heating water used in brewing beer, the hot liquor tank 30 having at least one electric heating element 32 that draws electricity from the power grid 26, and a mash tun 34 that is in fluid communication with the hot liquor tank 30, whereby water is heated in the hot liquor tank 30 by the electric heating element 32 and then transferred to the mash tun 34.

The bicycle 12 can comprise any suitable type of bicycle 12 that is well-known in the art, including those intended for outdoor use or stationary bikes that are used for exercising. As described in greater detail below, there also exist stationary bikes that are designed specifically to be attached to a bicycle generator 14 for the specific purpose of generating electricity. It is intended that any of these bicycles 12 would be suitable for use herewith.

Furthermore, although a bicycle 12 is preferably used to drive the bicycle generator 14, any other suitable type of device that can transform human effort into mechanical energy may be used herewith, including treadmills, stair machines, rowing machines, and so forth.

There is also provided a bicycle generator 14 associated with each bicycle 12. The bicycle generator 14 is powered by the bicycle 12, and as understood by those having ordinary skill in the art, the generator 14 uses rotational energy to rotate a rotor about a stator to induce an electrical current in the generator 14. As commonly understood, the bicycle generator 14 produces DC electricity. Any suitable type of generator that can be configured to be driven, or powered, by rotational energy can be used. The bicycle generator 14 can include any commercially-available bicycle generators 14 that are available. For example, any of the bicycle generators sold by Alternative Sustainable Energy LLC on its web site at http://asepower.com can be used, including those identified by model numbers PBK-R300w and PPG-B300w.

There are also commercially-available bicycle 12 and bicycle generators 14 that are packaged and sold as a combination, such as model number SBG-300-CC-12v-110v sold by Alternative Sustainable Energy LLC.

Also provided is a data collector 16 that is electrically connected to each bicycle generator 14. The data collector 16 has at least one electrical input 36, and each provided electrical input 36 is configured to receive electricity from a respective bicycle generator 14. The data collector 16 also includes an electrical power output 38 associated with each electrical input 36. Each provided electrical power output 38 is electrically connected to and delivers power to a power inverter 22, as described in greater detail below. The electricity received from the bicycle generators 14 exits the data collector 16 through the power output(s) 38.

The data collector 16 also includes a data output port 40. Information relating to the electricity flowing into the data collector 16 through each electrical input 36 is transmitted to a computer 18 via the data output port 40. The data includes any variety of information pertaining to the electricity generated by the bicycle generators 14, including but not limited to, the amount of electricity generated by each bicycle generator 14 in real-time. The data output port 40 is connectable to any suitable type of data-carrying conduit 46, such as a USB cord, a network cord, or the like. Wireless devices can also be used, such as those utilizing Bluetooth® wireless technology.

A detailed description of the electrical wiring within the data collector 16 has not been provided because one having ordinary skill in the art can accomplish the desired functionality of the data collector 16 using the skill that he or she possesses.

As mentioned above, the computer 18 is connected to and receives data from the data output port 40. The computer 18 includes software that is configured to monitor and record the amount of electricity generated by each bicycle generator 14. The software includes user accounts associated with specific patrons of the brewery 28. When a patron would like to produce electricity to be used in brewing the beer, the patron accesses his or her user account by logging in and then begins riding the bicycle 12. The patron can log in using any suitable method, such as typing in a user name and password, swiping an ID card, etc. The electricity produced by that patron flows from the respective bicycle generator 14 to the data collector 16. The data pertaining to that user account is transmitted to the computer 18 via the data output port 40. The software operating on the computer 18 monitors and records the amount of electricity being produced by that patron and their respective user account. The software has a database that tallies and records the cumulative amount of electricity produced by each user account, and also contains data values representing the amount of electricity required for the brewery 28 to brew specific volumes of beer.

For example, the database may include known milestone values representing the amount of electricity to brew one bottle, one gallon, one barrel, etc. The real-time data is tallied along with the historical cumulative data so that it is known when various milestone values have been achieved by each user account, "leagues" of user accounts, or all of the user accounts in total. The software additionally displays this information in real-time in a user-friendly graphical format that is visually displayed in the brewery 28 and/or to the patrons riding the bicycles 12.

To that end, a video monitor 20 is connected to the computer 18 and receives a video signal from the computer 18 via any suitable video cord, such as an HDMI cord or the like. The video monitor 20 can comprise a television, computer monitor, etc. As mentioned above, the video monitor 20 is preferably positioned so that it is viewable by the patrons riding bicycles 12, as well as any other suitable location throughout the brewery 28. Multiple video monitors 20 displaying the video signal can also be used.

Referring back to the collection of electricity from the bicycle generators 14, a power inverter 22 is connected to the electrical power outputs 38 of the data collector 16. As understood by those having ordinary skill in the art, the power inverter 22 converts DC power into AC power. The power inverter 22 also combines the electricity carried by the electrical inputs 36 into a single conduit that is connected to the breaker box 24. Any suitable well-known type of inverter can be used herewith. For example, a commercially-available example of the power inverter 22 is sold by Alternative Sustainable Energy LLC under the model name CBX-20i-CC-APM20.

There is also provided a circuit breaker box 24 that is electrically connected to the power inverter 22. The breaker box 24 is any suitable type of circuit breaker box 24 that is well-known in the art. The breaker box 24 receives the flow of AC power from the power inverter 22. The breaker box 24 is also connected to the power grid 26, or electrical network. In this manner, AC power that is provided to the breaker box 24 is then delivered to the power grid 26.

There is also provided a brewery 28 including a hot liquor tank 30 for heating water used in brewing beer. As understood by those having ordinary skill in the art of brewing, a hot liquor tank 30 is a container for holding and heating water that is heated for the brewing process. The hot liquor tank 30 includes at least one electric heating element 32 for heating the water. The heating element 32 is electrically connected to the breaker box 24 and powered by electricity drawn from the power grid 26. Any suitable type of electric heating element 32 used for heating water can be used, including those that are typically used in an electric water heater. Preferably, a plurality of heating elements 32 are provided to rapidly heat the water.

The brewery 28 also includes a mash tun 34 that is in fluid communication with the hot liquor tank 30. As understood by those having ordinary skill in the brewing arts, a mash tun 34 is a container, such as a tank in which the brewing grains are steeped in the water that was heated in the hot liquor tank 30. The water heated in the hot liquor tank 30 is transferred to the mash tun 34 where the heated water is mixed with the brewing grains. The wet, heated grains release enzymes which convert proteins in the grains into sugars, the sugars being fermentable by brewing yeast. In this embodiment, the mash tun 34 can also function as a lauter tun 35 and include a filter 42 at the bottom end that allows the hot steeped water, referred to as wort, to be drained through the filter 42 and into a kettle 50. As understood by those having ordinary skill in the brewing arts, the wort can be recirculated through the filter 42 to eliminate grain particles and sediment from the wort. As further understood by those having ordinary skill in the art, a sparging process may take place in the lauter tun 35 as well.

The kettle 50 has at least one electric heating element 32 which is used to boil the wort. While the wort is boiled, specified amounts of hops are added at specific time intervals to impart hop flavoring on the finished beer.

As shown in FIG. 1, a plurality of transfer conduits 45 are used to fluidly connect the vessels to one another. The transfer conduits 45 can be any suitable type of hose or other conduit that are suitable for use herewith. Preferably the transfer conduits 45 can withstand high temperatures and are made from food-grade materials. It is to be understood that one having ordinary skill in the art of brewing can select a suitable type of transfer conduit 45 to use herewith. Furthermore, a pump (not shown) may be provided for any of the transfer conduits 45 to pump the contents from one vessel to the next.

Preferably, and as shown in FIG. 1, the mash tun 34 and the lauter tun 35 are separate vessels. In this case, the entire contents of the mash tun (both the wort and the grains) are transferred to the lauter tun 35 at the end of the mashing process. Once the wort and grains are in the lauter tun 35, the wort is then separated from the grains by the filter 42 before it is transferred to the kettle 50.

Figure 4:
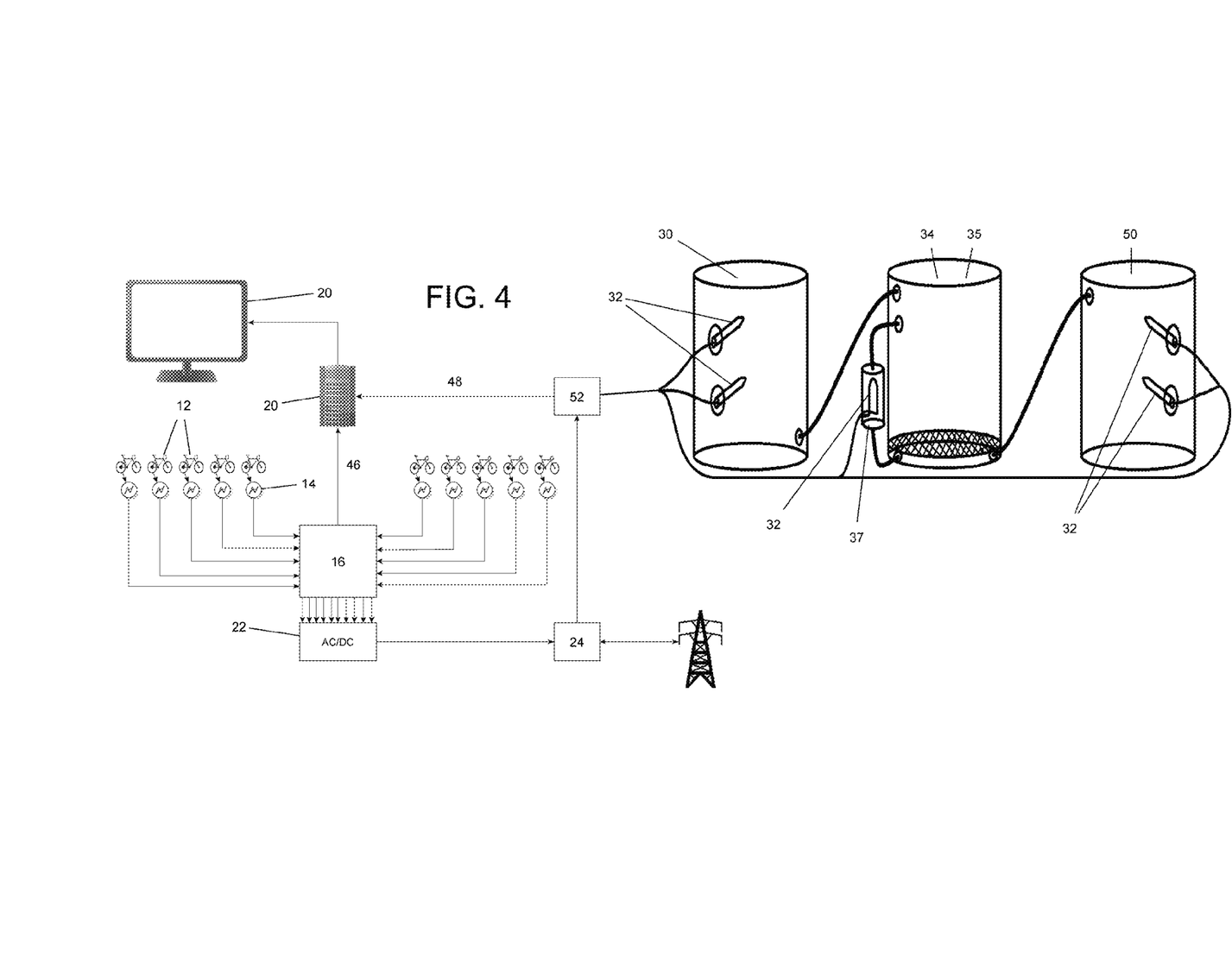
FIG. 4 is a schematic view of another embodiment of the invention being used with a brewery which includes a recirculated infusion mash system.

Optionally, and as shown in FIG. 4, the brewery 28 can include a recirculated infusion mash system (RIMS) in which the wort is circulated through the filter 42, through a first conduit 41 that exits the mash tun 34 below the filter 42, into an external heater 37 which includes a heating element 32, through a second conduit 43, and back into the combined mash tun 34 and lauter tun 35 at a position above the filter 42. In this manner, the heating element 32 in the external heater 37 functions to add an equal amount of heat to the wort that has been lost, thereby maintaining a relatively steady and constant temperature to the contents of the combined mash tun 34 and lauter tun 35. As understood by those having ordinary skill in the art, the RIMS system is one particular type of brewing system that can be used to help maintain the proper temperature of the contents in the mash tun 34 in order to brew a consistent beer from batch to batch.

Figure 5:
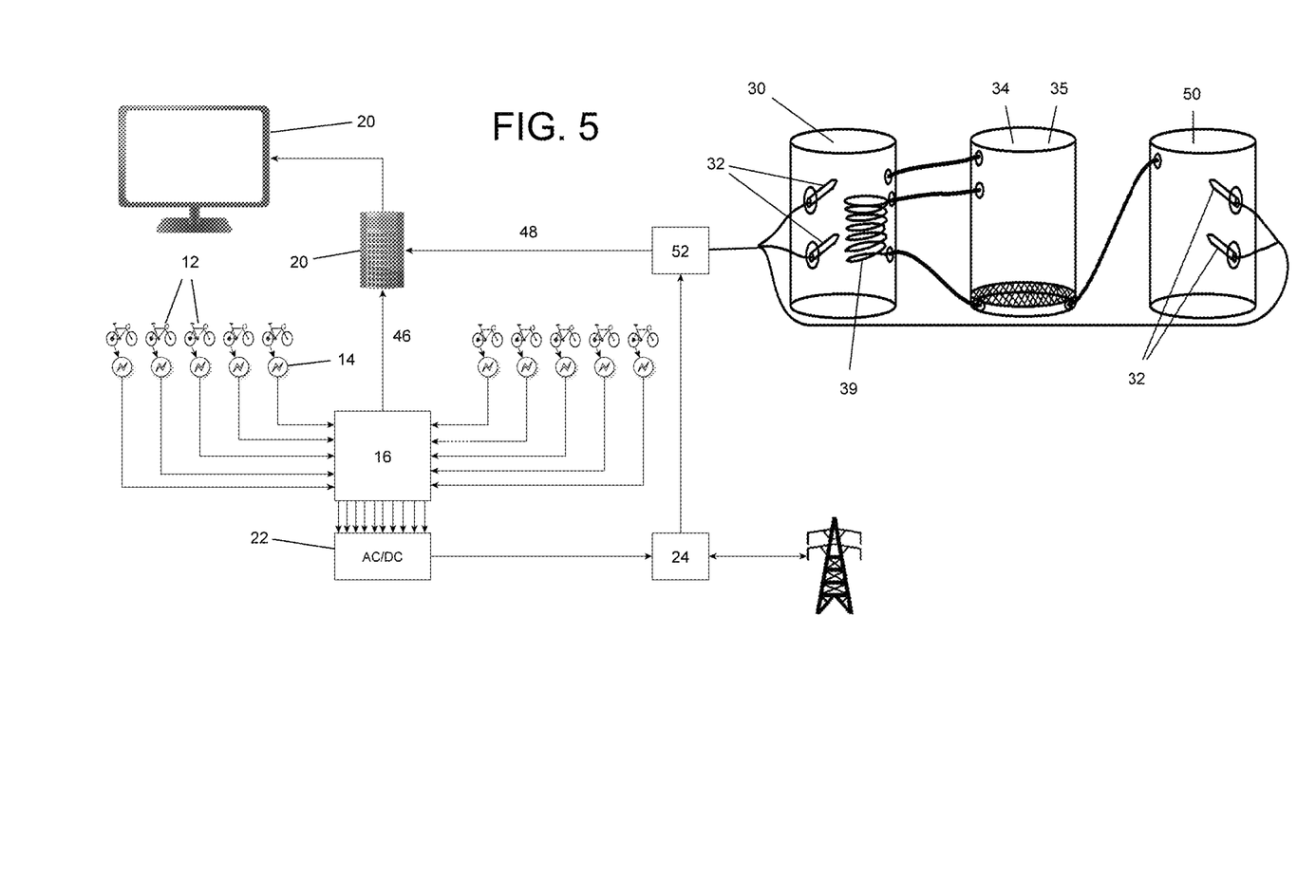
FIG. 5 is a schematic view of another embodiment of the invention being used with a brewery which includes a heat exchange recirculated mash system.

Another optional type of recirculating mash system that can be used herewith is shown in FIG. 5. FIG. 5 depicts an embodiment of the invention with a brewery 28 that includes a heat exchange recirculated mash system (HERMS). In the HERMS system, the wort passes through the filter 42, and then flows out of the mash tun 34 via the first conduit 41, through a heat exchanger 39 that is inside of the hot liquor tank 30, through a second conduit 43, and back into the combined mash tun 34 and lauter tun 35 at a position above the filter 42. The wort does not mix with the water inside the hot liquor tank 30. Rather, the water inside the hot liquor tank 30 is maintained at a constant temperature so as to transfer its heat to the wort passing through the heat exchanger 39. The wort circulates through the mash tun 34 and the heat exchanger 39 to maintain the temperature of the contents in the mash tun 34 at a very stable temperature despite any temperature losses that occur.

In both the RIMS and HERMS systems, a pump (not shown) is provided to circulate the wort through the respective recirculated systems.

The brewery 28 includes a control panel 52. The control panel 52 receives electricity from the breaker box 24 and transmits the electricity to the heating elements 32. The control panel 52 includes circuitry to adjust the amperage and voltage of the electricity as needed so that it is suitable for the heating elements 32. The control panel 52 also includes hardware or software that controls the operation of the heating elements 32 as required by the brewing process. Pumps and valves (not shown) can be used to pump the water and wort between the various brewing vessels (i.e., the hot liquor tank 30, mash tun 34, lauter tun 35, and kettle 50), and the pumps and valves can also be controlled by the control panel 52 so that the brewing process can be fully or partially automated. Each of the brewing vessels can also include a thermometer or temperature sensor/probe (not shown) for monitoring the temperature of the contents, and the control panel 52 can be electrically connected to each thermometer to monitor and control this crucial aspect of the brewing process.

Optionally, data is fed back to the computer 18 through a second data-carrying conduit 48 that reports the actual amount of electricity used to brew beer and operate the brewery 28. The conduit 48 preferably transmits this data from the control panel 52 to the computer 18.

Figure 2:
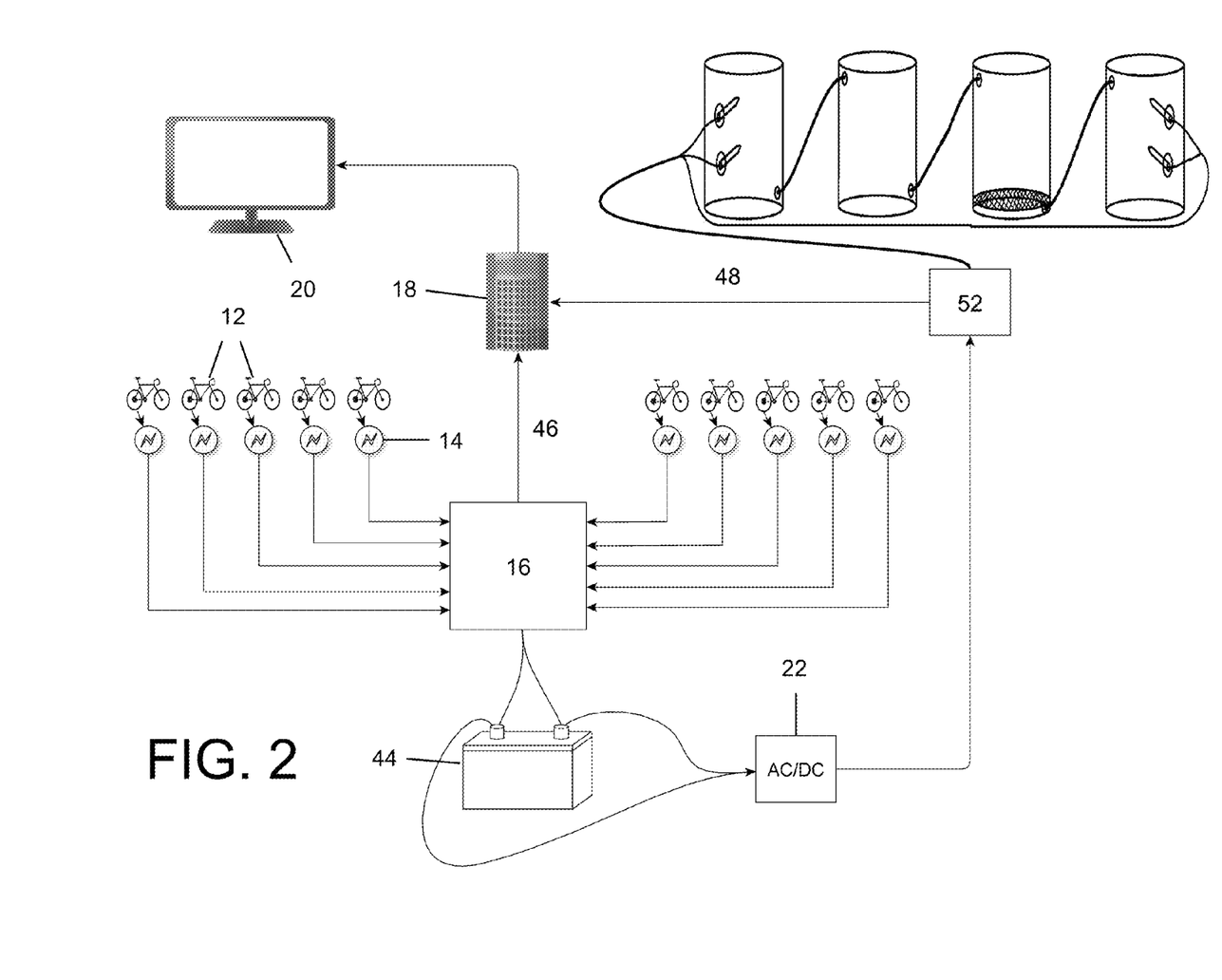
FIG. 2 is a schematic view showing a second embodiment hereof, the second embodiment including a battery for storing the electricity produced by the bicycle generator.
Figure 3:
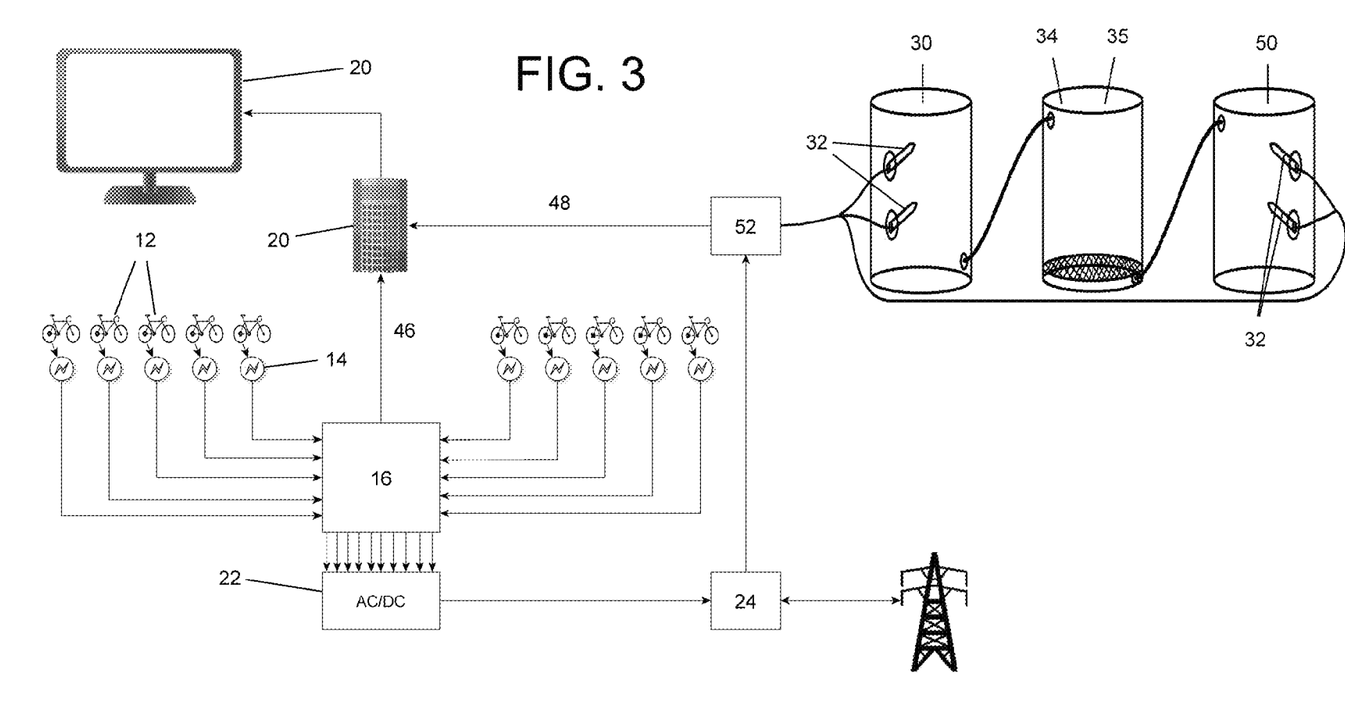
FIG. 3 is a schematic view showing an embodiment the invention in which the brewery includes three separate brewing vessels, the mash tun and the lauter tun being combined into a single vessel.

According to a second embodiment shown in FIG. 2, there is provided an "off the grid" version of the present invention. This second embodiment includes the bicycle 12, the bicycle generator 14, the data collector 16, the computer 18, the video monitor 20, the power inverter 22, and the brewery 28. However, unlike the first embodiment which includes the power grid 26 and the breaker box 24, this second embodiment has at least one battery 44 connected to the electrical power output 38 of the data collector 16. DC power flows from the electrical power output 38 of the data collector 16 to the battery 44 where the DC power is stored for future use. Preferably, a plurality of batteries 44 are supplied, and any suitable type of battery can be used, including lithium ion, dry cell, and so forth.

The battery 44 is also electrically connected to the power inverter 22 which converts the DC power to AC power. The power inverter 22 is electrically connected to the heating element 32 in the hot liquor tank 30, thus allowing electricity to be drawn off the battery 44 to the heating element 32 during the brewing process.

Optionally, any other suitable type of green or renewable energy source can also be used to power the electric heating elements. For example wind turbines or solar panels can be used as well, and configured so that the software can track the electricity generated by each of these optional auxiliary sources of electricity as well, including the volume of beer that can be brewed using energy collected from these sources. These energy sources can be electrically connected to feed electricity either back into the power grid or into the battery, as described above.

As mentioned above, the performance of each participating patron can be tracked and stored. It is envisioned that particular milestones can be set and that the patrons can achieve each level of participation. For example, the first achievement level may be generating the amount of electricity required to brew a single beer. There will be particular reward associated with this achievement. The second achievement level may be generating the amount of electricity required to brew a pitcher of beer, with a more impressive reward attached to this achievement. As the achievement levels increase, the value of the reward will increase as well. There may be a final achievement level, such as 1,000 hours or a certain number of kilowatts, at which point the patron is "retired" and they receive public accolades through a party or having their picture permanently placed on the brewery's wall.

Therefore it is seen that a unique brewing system has been described which uses renewable and green sources of power for powering the brewery. In addition, there is an interactive portion of the system which tracks and records performances by each user and displays data representing the electricity generated in a manner that encourages further involvement by the patrons.

What is claimed is:

1. A brewing system comprising:
   at least one bicycle;
   a bicycle generator associated with each bicycle, the bicycle generator being powered by the bicycle and configured to produce DC power;
   a data collector electrically connected with each bicycle generator, the data collector having at least one electrical input, the electrical input being connected to a respective one of the bicycle generators and receiving electricity therefrom, the data collector also having an electrical power output associated with each electrical input, and a data output;
   a computer that is connected to, and receives data from, the data output, the computer having software that is configured to monitor and record the amount of electricity generated by each bicycle generator;
   a video monitor that is connected to, and receives a video signal from, the computer, the video monitor configured to display real-time statistics of the electricity produced by each bicycle;
   a power inverter connected to each electrical power output, the power inverter being configured to convert the DC power into AC power;
   a breaker box connected to the power inverter, the breaker box receiving the AC power from the power inverter;
   a power grid connected to the breaker box, the power grid receiving the AC power from the breaker box; and
   a brewery including a hot liquor tank, a mash tun, and a kettle, the hot liquor tank provided for heating water used in brewing beer, the hot liquor tank having at least one electric heating element that is electrically connected to the breaker box and powered by electricity drawn from the power grid, and the mash tun being in fluid communication with the hot liquor tank to receive heated water from the hot liquor tank, and the kettle being in fluid communication with the mash tun to receive a wort solution that exits the mash tun, the kettle having at least one electric heating element that is electrically connected to the breaker box and powered by electricity drawn from the power grid.

2. The brewing system of claim 1 wherein the mash tun includes a filter at a bottom end thereof.

3. The brewing system of claim 2 including a recirculated mash system in fluid communication with the mash tun, the recirculated mash system having an external heater which includes a heating element that is electrically connected to the breaker box and powered by electricity drawn from the power grid.

4. The brewing system of claim 2 including a heat exchange recirculated mash system, the heat exchange recirculated mash system including a heat exchanger positioned inside the hot liquor tank, and the heat exchanger being in fluid communication with the mash tun via a first conduit and a second conduit, the first conduit extends from the heat exchanger to the mash tun at a position below the filter, and the second conduit extends from the heat exchanger to the mash tun at a position above the filter.

5. The brewing system of claim 1 including a lauter tun that is in fluid communication with the mash tun and the kettle, the lauter tun being positioned between the mash tun and the kettle, and the lauter tun having a filter for filtering contents received from the mash tun before the contents enter the kettle.

6. The brewing system of claim 1 including a recirculated mash system in fluid communication with the mash tun, the recirculated mash system having an external heater which includes a heating element that is electrically connected to the breaker box and powered by electricity drawn from the power grid.

7. The brewing system of claim 1 including a heat exchange recirculated mash system, the heat exchange recirculated mash system including a heat exchanger positioned inside the hot liquor tank, and the heat exchanger being in fluid communication with the mash tun via a first conduit and a second conduit, the first conduit extends from the heat exchanger to the mash tun, and the second conduit extends from the heat exchanger to the mash tun.

8. A brewing system comprising:
   at least one bicycle;
   a bicycle generator associated with each bicycle, the bicycle generator being powered by the bicycle and configured to produce DC power;
   a data collector electrically connected with each bicycle generator, the data collector having at least one electrical input, the electrical input being connected to a respective one of the bicycle generators and receiving electricity therefrom, the data collector also having an electrical power output associated with each electrical input, and a data output;
   a computer that is connected to, and receives data from, the data output, the computer having software that is configured to monitor and record the amount of electricity generated by each bicycle generator;
   a video monitor that is connected to, and receives a video signal from, the computer, the video monitor configured to display real-time statistics of the electricity produced by each bicycle;
   at least one battery connected to each electrical power output for storing the DC power;
   a power inverter connected to the battery, the power inverter being configured to convert the DC power into AC power; and
   a brewery including a hot liquor tank, a mash tun, and a kettle, the hot liquor tank provided for heating water used in brewing beer, the hot liquor tank having at least one electric heating element that is connected to the power inverter and powered by electricity drawn from the battery, and the mash tun being in fluid communication with the hot liquor tank to receive heated water from the hot liquor tank, and the kettle being in fluid communication with the mash tun to receive a wort solution that exits the mash tun, the kettle having at least one electric heating element that is connected to the power inverter and powered by electricity drawn from the battery.

9. The brewing system of claim 8 wherein the mash tun includes a filter at a bottom end thereof.

10. The brewing system of claim 9 including a recirculated mash system in fluid communication with the mash tun, the recirculated mash system having an external heater which includes a heating element that is electrically connected to the power inverter and powered by electricity drawn from the battery.

11. The brewing system of claim 9 including a heat exchange recirculated mash system, the heat exchange recirculated mash system including a heat exchanger positioned inside the hot liquor tank, and the heat exchanger being in fluid communication with the mash tun via a first conduit and a second conduit, the first conduit extends from the heat exchanger to the mash tun at a position below the filter, and the second conduit extends from the heat exchanger to the mash tun at a position above the filter.

12. The brewing system of claim 8 including a lauter tun that is in fluid communication with the mash tun and the kettle, the lauter tun being positioned between the mash tun and the kettle, and the lauter tun having a filter for filtering contents received from the mash tun before the contents enter the kettle.

13. The brewing system of claim 8 including a recirculated mash system in fluid communication with the mash tun, the recirculated mash system having an external heater which includes a heating element that is electrically connected to the breaker box and powered by electricity drawn from the power grid.

14. The brewing system of claim 8 including a heat exchange recirculated mash system, the heat exchange recirculated mash system including a heat exchanger positioned inside the hot liquor tank, and the heat exchanger being in fluid communication with the mash tun via a first conduit and a second conduit, the first conduit extends from the heat exchanger to the mash tun, and the second conduit extends from the heat exchanger to the mash tun.

* * * * *